No. 667,839. Patented Feb. 12, 1901.
N. R. GARNER.
CULTIVATOR AND HARROW.
(Application filed July 28, 1900.)
(No Model.)
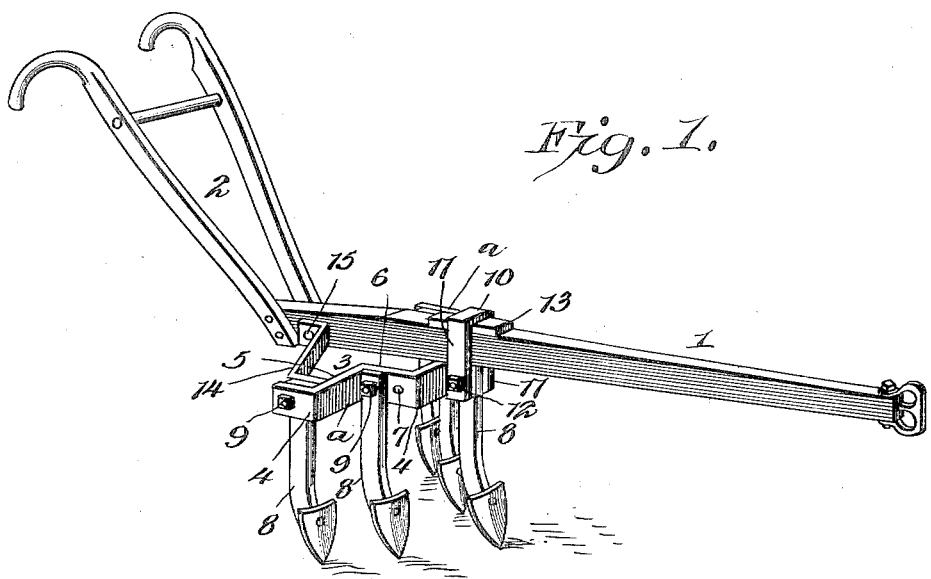
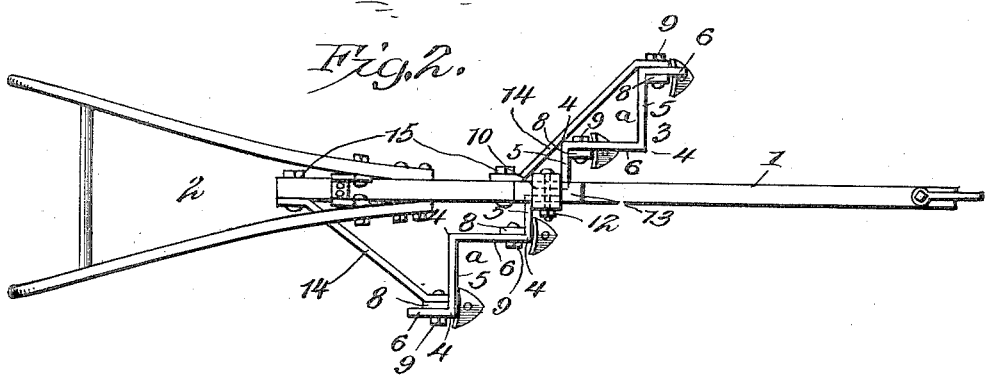
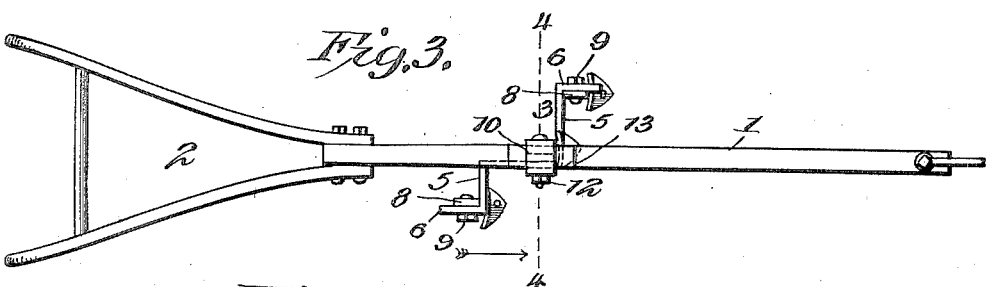
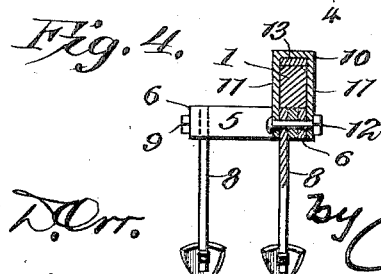
Witnesses
Howard D. Orr.
J. W. Garner
Nathan R. Garner, Inventor.
by C. A. Snow & Co.
Attorneys

UNITED STATES PATENT OFFICE.

NATHAN R. GARNER, OF HISSOP, MISSISSIPPI.

CULTIVATOR AND HARROW.

SPECIFICATION forming part of Letters Patent No. 667,839, dated February 12, 1901.

Application filed July 28, 1900. Serial No. 25,165. (No model.)

*To all whom it may concern:*

Be it known that I, NATHAN R. GARNER, a citizen of the United States, residing at Hissop, in the county of Smith and State of Mississippi, have invented a new and useful Cultivator and Harrow, of which the following is a specification.

My invention is an improved cultivator and harrow, the object of my invention being to provide an implement which may be used either as a cultivator or as a side harrow and in which the number of cultivating-shovels or harrow-teeth may be varied at will and disposed as may be required.

My invention consists in the peculiar construction and combination of devices hereinafter fully set forth, and pointed out in the claims.

In the accompanying drawings, Figure 1 is a perspective view of my invention arranged as a V-shaped cultivator having five cultivating-shovels. Fig. 2 is a top plan view of the same arranged as a cultivator, with the cultivating-shovels disposed obliquely on opposite sides of the beam and four cultivating-shovels being used thereon. Fig. 3 is a similar view of the same equipped with three cultivating-shovels carried by a single section of the bar. Fig. 4 is a detail sectional view taken on the line 4 4 of Fig. 3.

The beam 1 is the same as that commonly used on a turning-plow, and the handles 2, attached to the beam, are also of the usual construction. In the embodiment of my invention I provide a supporting-bar 3, formed of two separable sections $a$. The bar is disposed obliquely under the beam and is provided throughout its extent with right-angular bends 4, the portions 5 of the bar formed by the said bends being transversely disposed with reference to the beam 1 and the portions 6 of the bar formed by the said bends being longitudinally disposed and parallel with the beam. The said longitudinally-disposed portions 6 of the bar are provided with suitable bolt-holes 7, and standards 8, of suitable construction, have their upper ends disposed in the angles between the portions 5 6 of the bar and secured thereto by bolts 9, which extend through openings in the upper ends of the standards and through appropriate openings 7. The bar 3 is secured under the beam by a U-shaped keeper 10, which is inverted, as shown, is disposed astride of the beam, and has the depending arms 11, which extend below the under side of the beam. One of the longitudinally-disposed portions 6 of the bar 3 is bolted between the lower ends of the arms 11 of keeper 10, as at 12, and thereby the bar 3 is secured firmly in a diagonal position under the beam. A wedge-key 13 is driven between the upper side of the keeper and the beam to prevent the keeper from working loose on the beam, and when the two sections $a$ of the bar are employed, as in Figs. 1 and 2, with their overlapping portions bolted together by the bolt 12, between the arms 11 of the keeper, brace-bars 14 are employed in connection therewith, the said brace-bars having their front ends bolted to the outer ends of the sections of bar 3 and their rear ends bolted on opposite sides of the beam by a bolt 15.

The sections $a$ of the bar 3 may be disposed in substantially a right line with relation to each other and obliquely with relation to the beam, as in Fig. 2 of the drawings, or they may be disposed in V form, as shown in Fig. 1 of the drawings, and when only one section of the bar 3 is used the same may be secured with its central portion under the beam, as shown in Fig. 3, or either end thereof may be secured between the arms 11 of the keeper, so as to extend the entire length of the said section to either side of the beam, as will be understood.

Cultivating-shovels of suitable form may be secured to the standards 8 when the implement is to be used as a cultivator, and suitable points or teeth may be substituted for the cultivating-shovels when my invention is to be used as a harrow.

The handles may be secured to the rear end of the beam, as shown in Figs. 1 and 3, or they may be secured to the beam at a point slightly in rear of the keeper, as shown in Fig. 2.

The brace-bars 14 are of like shape and dimensions and serve to secure the bar 3 either when disposed in V shape, as in Fig. 1, or when disposed in a single oblique line, as in Fig. 2.

Having thus described my invention, I claim—

1. The combination of a beam, a bar disposed obliquely under the beam and having right-angular bends, standards secured in the said bends of the said bar, and the keeper, astride of the beam and having the arms depending thereform, said obliquely-disposed bar being secured between said arms of said keeper, substantially as described.

2. The combination of a beam, a bar disposed obliquely under the beam and having right-angled bends, said bar comprising a pair of sections having overlapping meeting ends, standards secured in the said bends of the said bar, the keeper, astride of the beam and having the arms depending therefrom, the overlapping meeting ends of said sections of said bar being secured between the depending arms of the said keeper, and braces connecting the outer ends of the said obliquely-disposed bar to the beam, substantially as described.

In testimony that I claim the foregoing as my own I have hereto affixed my signature in the presence of two witnesses.

NATHAN R. GARNER.

Witnesses:
JOHN B. CURRIE,
G. M. MARTIN.